United States Patent
Gage et al.

(10) Patent No.: US 11,908,302 B1
(45) Date of Patent: Feb. 20, 2024

(54) VEHICLE AS A BEACON

(71) Applicant: FORD GLOBAL TECHNOLOGIES, LLC, Dearborn, MI (US)

(72) Inventors: Stephanie Gage, Northville, MI (US); Raymond Theodore Gage, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/875,537

(22) Filed: Jul. 28, 2022

(51) Int. Cl.
| | |
|---|---|
| *G08G 1/00* | (2006.01) |
| *G08B 21/22* | (2006.01) |
| *G08B 21/02* | (2006.01) |
| *B60Q 9/00* | (2006.01) |
| *H04W 4/02* | (2018.01) |
| *H04W 4/90* | (2018.01) |
| *G07C 9/00* | (2020.01) |

(52) U.S. Cl.
CPC .............. *G08B 21/22* (2013.01); *B60Q 9/00* (2013.01); *G07C 9/00309* (2013.01); *G08B 21/02* (2013.01); *H04W 4/023* (2013.01); *H04W 4/90* (2018.02); *G07C 2009/00769* (2013.01); *G07C 2209/63* (2013.01)

(58) Field of Classification Search
CPC .......... G08B 21/22; G08B 21/02; B60Q 9/00; G07C 9/00309; G07C 2009/00769; G07C 2209/63; H04W 4/023; H04W 4/90
USPC ................................................ 340/901, 539.1
See application file for complete search history.

(56) References Cited

U.S. PATENT DOCUMENTS

| | | | |
|---|---|---|---|
| 10,375,512 B2 | 8/2019 | Marko | |
| 10,692,314 B2 | 6/2020 | Kerning et al. | |
| 2010/0022255 A1* | 1/2010 | Singhal | G08G 1/20 455/457 |
| 2011/0063096 A1* | 3/2011 | Ebizawa | B60R 25/24 340/425.5 |
| 2011/0149756 A1* | 6/2011 | Chan | G01S 5/14 370/252 |
| 2011/0210847 A1* | 9/2011 | Howard | G08B 21/0244 340/539.32 |
| 2014/0011482 A1* | 1/2014 | Le | H04W 12/126 455/414.1 |
| 2014/0148195 A1* | 5/2014 | Bassan-Eskenazi | H04W 4/023 455/456.1 |
| 2014/0308971 A1* | 10/2014 | O'Brien | H04W 4/023 455/456.1 |
| 2016/0055175 A1* | 2/2016 | Thompson | G08B 21/0269 707/722 |
| 2020/0065722 A1* | 2/2020 | Smith | G06Q 50/30 |

* cited by examiner

*Primary Examiner* — Tai T Nguyen
(74) *Attorney, Agent, or Firm* — Joseph Zane; Brooks Kushman P.C.

(57) ABSTRACT

A vehicle determines that a trigger state designated for user assistance for a user traveling away from a vehicle has occurred. The vehicle determines that an alert action to be taken, defined in conjunction with the trigger state and determines that a user has not returned to a vehicle based on a failure to detect a user wireless device. The vehicle automatically executes the alert action responsive to the trigger state occurrence and failure to detect the user device.

20 Claims, 4 Drawing Sheets

VEHICLE AS A BEACON

TECHNICAL FIELD

The illustrative embodiments generally relate to methods and apparatuses for using a vehicle as a beacon under various circumstances.

BACKGROUND

Advances in portable technology have made hiking through confusing areas much easier. Skilled hikers can obtain sophisticated GPS equipment, satellite phones, digital topographic maps, and generally be assured of a relatively issue free hike. While this may be a suitable plan for someone who hikes on a daily or weekly basis, many other people may simply want to go for a walk through the wilderness, or explore the surroundings of a campsite, and may not have planned ahead or want to spend thousands of dollars on gear.

The majority of casual hikers likely take little more than a small supply of food and a cellular phone on a hike, since the phone provides a flashlight and compass, and those hikers typically do not plan to be gone for more than a few hours. As many discover, however, once they are in the woods, trees tend to look very similar, and it is not that difficult to get lost, even if they are only a few thousand feet or less from an initial location. Underbrush can quickly obscure view of a campsite, and not taking headings and maintaining a known orientation can lead to a person "lost," only a short distance from where they need to be.

Of course, there are other unplanned impediments to a successful hike as well, such as sprained ankles, falls, running out of power on a mobile device, unexpected weather, exhaustion, etc. Many times even a well planned hike can run afoul of such circumstances, and such hikers may be reliant on other hikers or emergency services to come and assist them. If the hiker has communication available, or can reach an easily identifiable location, they can be swiftly found and assisted, but when such modern methods fail, they may be left to their own devices to find a way back to a starting point.

SUMMARY

In a first illustrative embodiment, a vehicle includes one or more processors configured to determine that a trigger state designated for user assistance for a user traveling away from a vehicle has occurred. The processors are also configured to determine an alert action to be taken, defined in conjunction with the trigger state and determine that a user has not returned to a vehicle based on a failure to detect a user wireless device. The processors are configured to automatically execute the alert action responsive to the trigger state occurrence and failure to detect the user device.

In a second illustrative embodiment, a method includes determining that a trigger state designated for user assistance for a user traveling away from a vehicle has occurred and that a user has not returned to a vehicle based on a failure to detect a user device. The method also includes determining an alert action to be taken, defined in conjunction with the trigger state and automatically executing the alert action responsive to the trigger state occurrence and failure to detect the user device.

In a third illustrative embodiment, a vehicle includes one or more processors configured to determine that a time threshold, designated by a user in advance of a journey away from a vehicle, has lapsed. The processors are also configured to, responsive to the lapsed threshold, scan for wireless signals associated with a device correlated to the user and, responsive to a failure to detect the device, engage in at least one predefined alert action.

DETAILED DESCRIPTION

Figure 1:
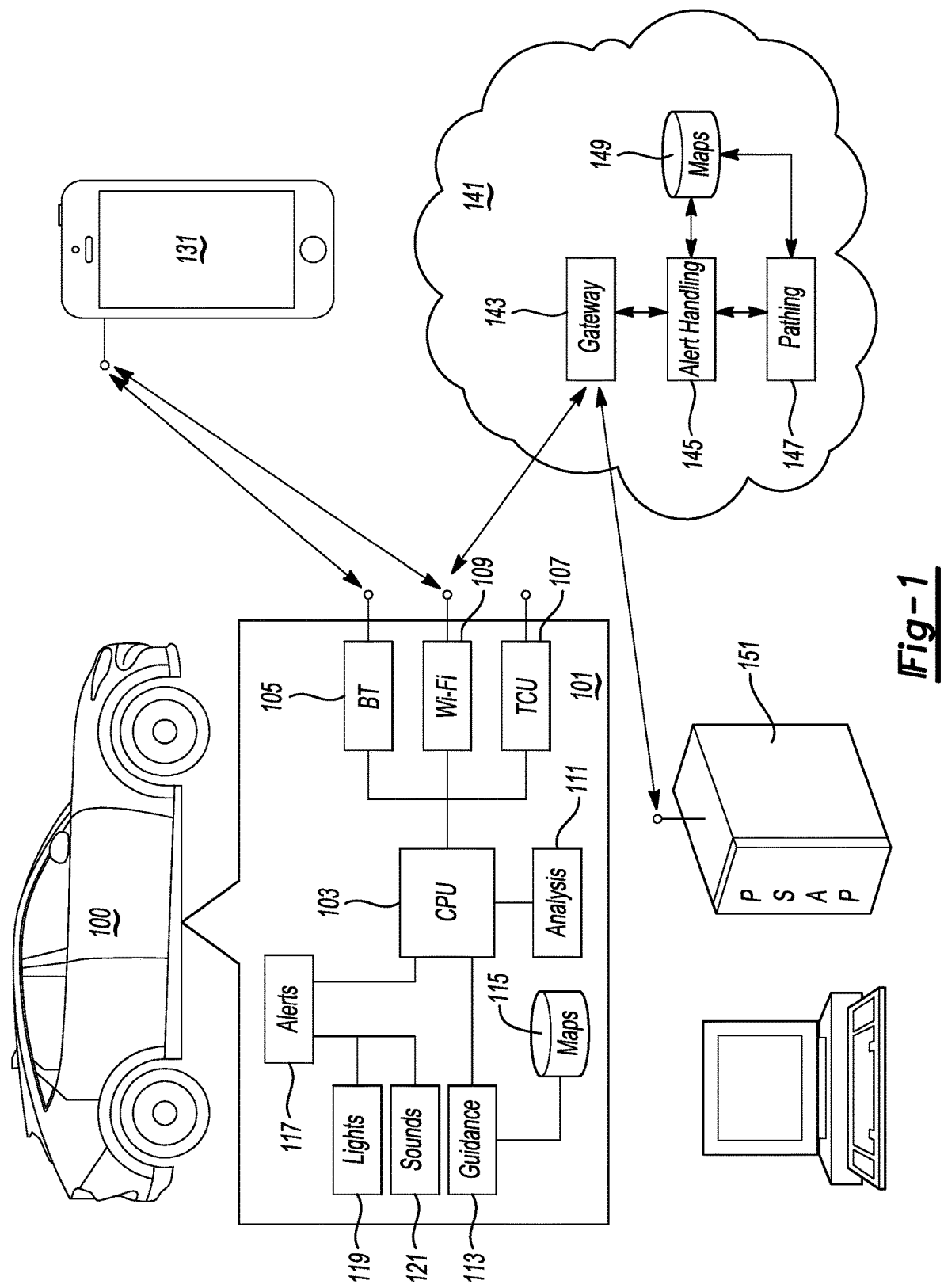
FIG. 1 shows an illustrative example of a vehicle beacon system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

One relatively common factor among hikers in modern times is that they reach a trail start point or campsite using some form of motorized transportation, often a vehicle. Modern vehicles are massively powerful portable computing devices, which can include advanced navigation capabilities, long range cellular communication, short range wireless communication, advanced lighting and sound systems, etc. The illustrative embodiments propose leveraging these systems to provide a mobile beacon that can guide a hiker home, monitor travel and ultimately assist in cases of emergencies.

Vehicles can receive planned hiking routes and timings, which may include a planned hiking path drawn out on a vehicle map provided on a touch sensitive display. The vehicle can show a topographic or geographic map of an area, and a hiker can trace a trail line or general GPS boundary around areas of intended travel. The vehicle can also receive timing data, indicating when a hiker is planning on arriving back at a vehicle.

Further, the vehicle can serve as a mobile weather station, tracking unexpected weather and taking assistance action under predefined circumstances. Lights and sounds can be used to provide a visual and audible beacon for local hikers seeking to complete a journey. Digital wireless guidance 113 can allow a vehicle to cooperate with a hiker's phone, in sufficient proximity, to guide the hiker home. If all goes awry, the vehicle also can automatically contact park services, other hikers and/or emergency assistance services to provide assistance in the event of a true emergency.

FIG. 1 shows an illustrative example of a vehicle beacon system. In this example, a vehicle 100 includes an onboard computing system 101. This typically includes one or more processors 103, as well as communication transceivers. Those transceivers may include, for example, BLUETOOTH transceivers 105, a telematics control unit (TCU) 107, capable of cellular communication, which may or may not include an onboard cellular modem, and a Wi-Fi transceiver 109. The Wi-Fi and BLUETOOTH transceivers 109, 105 can communicate with local user devices to provide a variety of services as discussed herein.

The TCU 107 may be capable of longer-range communication with a cloud 141 system, as well as may be able to use cellular connections to maintain communication with a user device 131, provided both the vehicle 100 and device 131 are within range of a cellular signal.

The system 101 may further include an analysis process 111 for handling situational analysis of a planned hike based on some user parameters and/or general environmental context (e.g., weather changes, daylight changes, etc.). Unexpected weather, or not returning before dark, can make it more difficult to find a site, even when nothing else is going wrong, and the vehicle 100 may be programmed to provide localized guidance 113 (lights, sounds, device-communication) under circumstances where foot-travel may become more difficult to accomplish.

A guidance process can use onboard maps 115 and/or remote maps 149 to provide guidance back to the vehicle, which can include headings and distances from a user device to the vehicle 100, or even more complete directions providing an ordered sequence of steps. For example, in one instance, as long as the vehicle 100 is capable of some form of continued or periodic device communication with the user device 131, the vehicle 100 may provide periodic guidance 113 updates home. That can include, for example, a set of instructions based on GPS coordinates, so that even if the phone 131 loses a cellular signal, the user can travel to a first point on the guidance path and follow the ordered instructions home based on GPS coordinates if they are still available. Based on GPS analysis, the phone should be able to direct the user in terms of at least heading and distance to a first point on a series of directions. The vehicle-provided directions may then be more detailed in terms of travel, to mark obstacles observed by the vehicle 100 on a topographic map, for example.

The vehicle 100 may also have visual and audible outputs 119, 121. These can include vehicle lights and both internal and external speakers. For example, a vehicle may sound a horn and flash lights for guidance to the vehicle or to alert other hikers. If the vehicle has an advanced sound system and sufficient power reserves, the vehicle 100 may even lower windows and play music or a sound at maximum volume. This can include custom sounds such as a replica of a siren or a recorded message indicating a need for assistance, if at least one goal is to attract the attention of others who may be within earshot.

The cloud 141 may include support services and/or communication capabilities for emergency assistance. A gateway process 143 may route incoming and outgoing requests, and requests from the vehicle may include alert handling requests through process 145. This alert process can determine a level of an incident and respond by, for example, providing advanced map guidance from a pathing process at 147, which may assist a lost hiker. The same map data 149 and process 147 may be used to direct a public access point 151 to a last-known location of a hiker and/or provide guidance to a vehicle 100 location.

Figure 2:
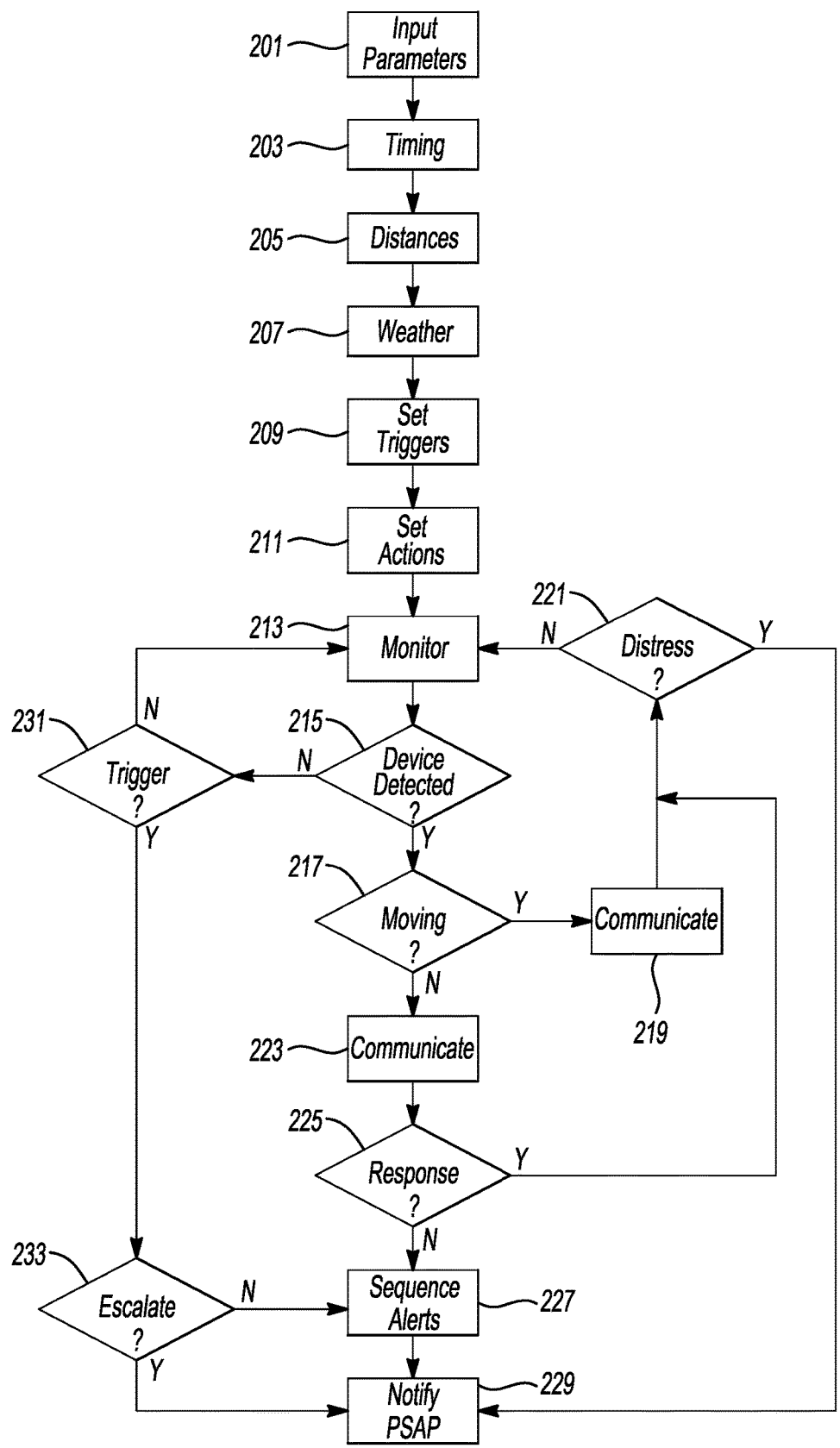
FIG. 2 shows an illustrative example of a configuration and monitoring process.

FIG. 2 shows an illustrative example of a configuration and monitoring process. In this example, a user will determine that a hike is planned at 201 and begin inputting parameters for return. This can include, for example, timing parameters at 203, such as a planned return time, a flexible return time, an emergency time, etc. For example, a user could leave at noon and plan to be back at 4 PM. Recognizing that the hike may run long, the user could put a flexible return time of 6 PM. The user could also put in an emergency return time of 8 PM, or, for example, a designator such as dusk or darkness, which a vehicle 100 can determine using ambient light sensing or tables indicating when those events occur on that day.

The user may also input distances at 205, which can include ranges from a vehicle, such as 1000 feet. The user may want to stay in proximity to the vehicle, and the vehicle can alert the user via device communication if the boundary is exceeded. If device communication is fading due to distance or signal loss, the process could also alert the user that the perimeter had not been breached, but that communication was fading. If cellular communication is available, the distances from the vehicle 100 can be determined based on GPS coordinate comparison between the device 131 and the vehicle 100 and can reach much longer distances. The user may also set weather parameters at 207. These can include alert states to be triggered when certain weather arises, and can include direct notifications to a mobile device 131 as well as alert trigger states in the vehicle 100 as discussed below.

Once all parameters have been input, or as parameters are input, various alert state triggers can be correlated to parameters at 209 and 211. While the vehicle 100 could simply be a "full alert" or "no alert" beacon, the user may want refined levels of guidance based on parameters input at 203, 205, 207. So, for example, once the flex timing parameter was breached, the vehicle could intermittently flash lights or sound a horn, to help guide a user home, but without creating maximum disturbance. Once a user was within range of communication, the user could confirm whether such alerts should continue or cease. If the emergency parameter for timing was breached, then the vehicle 100 may go into high alert, with loud and consistent audio, continual light provision and contacting emergency services.

Similarly, if the user exceeded a certain distance determined to likely be within earshot or eyeshot, the vehicle could trigger a low level alert to guide the user back within range, to prevent the user from wandering further away. The weather parameters may be set to trigger both alerts sent to a mobile device about incoming weather, as well as triggering lights and sounds under heavier conditions, to help the user find their way home. Again, if the weather grew too severe and direct device communication had not been re-established, the process could trigger an emergency alert protocol. What actions to take under what combinations of triggers can be defined at 209 and 211, which can include individual triggers (e.g., dark) and combination triggers (e.g., dusk and raining).

The user can then begin a hike whenever desired and a vehicle process can monitor 213 for the user device 131. Monitoring may include periodic signal sweeps or maintenance of direct communication with the device 131 while in range. The type of monitoring may include consideration of vehicle 100 power reserves, so as to maintain sufficient power to respond under emergency circumstances, which can include, for example, sounding audible alerts and flashing lights for hours if necessary.

If a device scan is performed and a device is detected as expected, the process may simply resume monitoring or may communicate with the device at 217 to determine if the device is moving. Initial monitoring, e.g., prior to a time trigger, may be periodic in nature or may not even occur until the timing of an expected arrival is imminent. This may depend on how much active guidance a user has requested from a vehicle.

After some period of time, such as when a first timing trigger has passed, the vehicle 100 may attempt to find the device and determine if the device is moving at 217. If the device evinces movement over some time period, it may be assumed that the user is progressing as intended. Nonetheless, the vehicle 100 may communicate with the detected device at 219 to determine if the user indicates any form of distress at 221. If there is no distress, the vehicle 100 may continue monitoring the device until the device returns within a close proximity of the vehicle 100.

If the device is not moving (e.g., no movement for five or ten minutes), the vehicle may again attempt communication at 223. In the moving device example, not responding to communication may indicate no distress, because the device is still moving. In the still device example, not responding may indicate a more dire predicament, and so different action may be taken.

If the user does respond at 225, they can indicate distress or otherwise at 221 and appropriate action can be taken. If the user does not respond after some reasonable time or number of communication attempts, the process may undertake a sequence of alerts at 227 and, barring any eventual response or movement of the device, ultimately contact emergency services at 229. This can include, when possible, using the vehicle 100 to establish a direct communication channel between emergency services and the device, if the vehicle 100 can use cellular communication but the device cannot, the vehicle can use Wi-Fi or other communication to act as a call relay station from the device to emergency services. This also allows the user to terminate the request for services if unneeded.

If no device is detected when expected to be detected based on the user settings for returning from a hike, the process may determine what trigger states have been met, if any. For example, a user could indicate that the device should be within 1 mile of the vehicle by 3 PM, and within a half mile of the vehicle by 4 PM. At that point in time, the designated triggers may include simple reminders sent to the device when out of planned distance and/or activation of lights/sounds to guide the user closer.

If a trigger state indicates an escalated response at 233, emergency services may be contacted immediately. Since the user had a general plan laid out by the parameters, the vehicle 100 could also inform emergency services of the general parameters and which parameters had not been met, as well as any likely locations of the user based on any prior communication during the hike, which can be used to approximate vectoring and ultimate locations.

Figure 3:
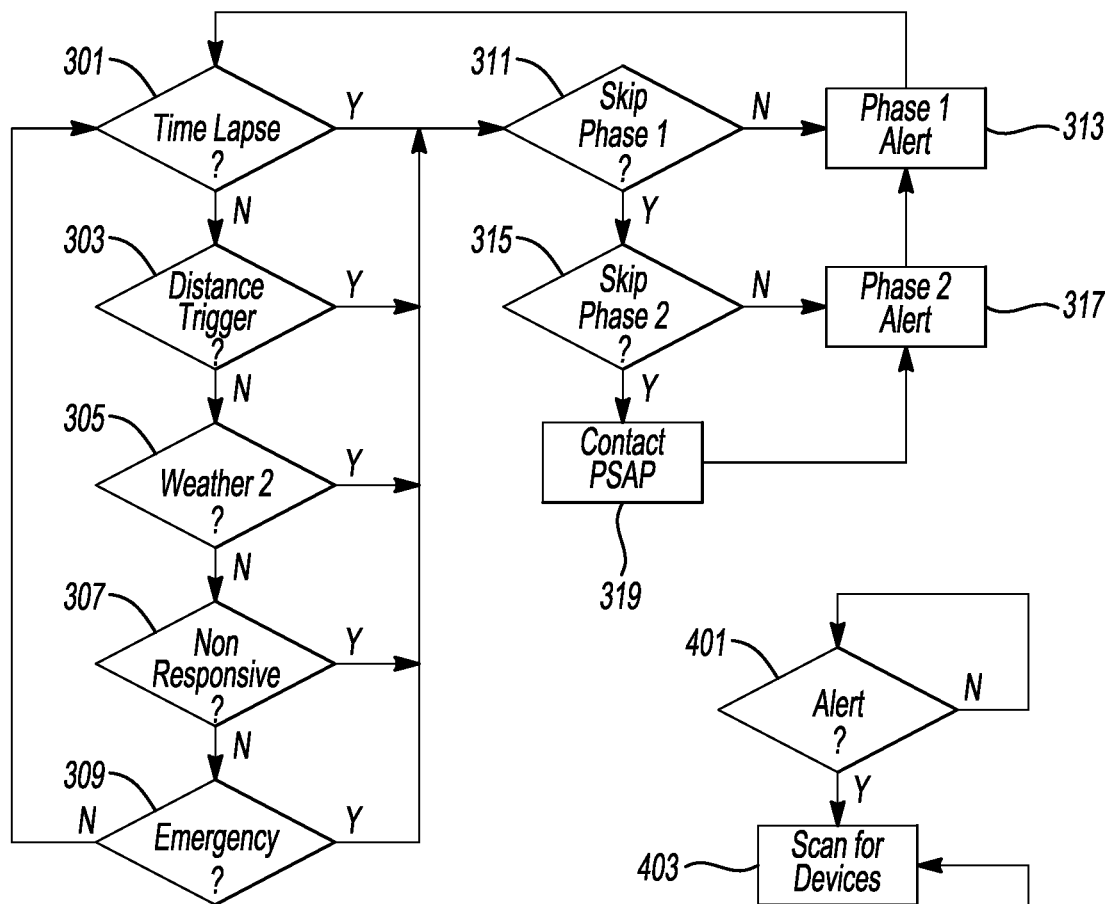
FIG. 3 shows an illustrative example of an alert triggering process.

FIG. 3 shows an illustrative example of an alert triggering process. This example shows a sequence of triggers that may be set, as well as example actions that may be taken when triggers are reached. Combinations of triggers can also cause actions to occur, based on predefined logic and/or user preferences.

If a timing parameter has lapsed at 301, this can cause triggering of one or more alerts. In this example, alerts include three stage handling, by way of example only, wherein the first stage includes alerts designed to guide a user home with minimal disturbance, the second stage includes more persistent alerts, and the third stage is designed to draw the attention of nearby third parties as well as contacting emergency services. Alerts can also be issued to one or more prespecified contacts at certain tiers, who may have more context than another party alerted and/or who may be able to take immediate remedial action.

Specific actions can be tied to a given alert, as opposed to general stages with a series of actions. For example, a user may only want flashing lights at night or only want audible sounds during the day (when lights may not be very useful)

for a low priority alert. Timing alerts can have escalation thresholds and trigger thresholds—for example, an arrival time of 4 PM could trigger a low level alert at 3:30 PM at fifteen minute intervals, with an escalation of intervals or volume when 4:45 PM was reached, and continuing escalation until reaching an emergency alert level. Accordingly, there does not need to be a fixed static definition for triggers and they can vary situationally. Combinations of factors may also play a role into increasing frequency or alert levels, so that if a number of low lever triggers are all met, they may cause triggering of a next level alert—e.g., timing threshold lapsed, plus weather, plus dark may cause both lights and sounds, even if the lights were all that were requested for any one trigger at the current thresholds.

Distance triggers at 303 can be used to determine if the user is within certain ranges at certain times, and can be tied to timing triggers, for example, assuming it is possible to determine the location of the user device 131 through some form of communication. Distance triggers outside the range of visual or audible alerts may simply trigger messaging to a phone in many circumstances, which can include reminders about proximity and/or guidance back to a vehicle when desired.

Weather triggers at 305 may be set for unexpected weather events, and can include rain, heat, humidity, etc., as all can have an effect on a hike. The user may even "expect" certain weather, but be unsure of the accuracy of the expectation, and so may have a series of triggers that send alerts to a phone and/or create vehicle alert states when certain triggers are reached.

The user can also set non-responsiveness triggers at 307. This can include parameters for device movement and for response times if the device 131 is contacted by the vehicle. That is, instead of simply using a fixed time for response or movement, the user can set individual times and tiers of times—e.g., no movement for five minutes is acceptable, no movement for 20 minutes is a first alert trigger, no movement for 30 minutes triggers an emergency alert. Similarly, no response within 10 minutes of a communication request may trigger a reminder request, no response within 20 minutes may trigger a first alert, etc.

There may also be a series of fixed emergency triggers, such as severe weather (snow, heavy rain, flash floods, tornadoes, etc.) which trigger a stage two or emergency services request immediately. Jumping to a higher state trigger may also trigger lower state response, e.g., even if emergency services is contacted, stage one and stage two alerts may also be triggered.

When a trigger causes a pass to an alert stage, the process can determine if a stage should be bypassed based on a prior triggering of the stage and/or a trigger setting. Stage one can be skipped at 311 and stage two at 315, if necessary based on prior alert stages or designation. Otherwise, the process can undertake full or partial stage one or stage two alerts at 313, 315. Ultimately, emergency services can be contacted at 319 when necessary.

The vehicle 100 may also monitor device power status while the vehicle is in communication with the device 131. This can be used to project if a communication loss was due to the device powering down, which may cancel alert status or may trigger a secondary timing process for alerts due to the device not being contactable. On the other hand, the user may have the vehicle 100 configured to issue at least audible guidance when the device loses power, in case the user is relying on the device 131 for navigation. The device 131 may also become broken during a hike, and the vehicle may not be able to recognize this, unless it determines that the device is likely broken because a prior device state had high power and good signal strength, that was immediately and unexpectedly lost. The user can have default settings (e.g., audible guidance) for when a device is determined to have been likely broken, or the user can rely on the general process of alerts.

Also, when a device returns to a vehicle and/or is detected by a vehicle during an alert paradigm, the alert process can be delayed or cancelled. For example, if the alert-time had passed, and the device was at least detected at a subsequent point, future alerts may be delayed unless the device stopped moving or moved in an incorrect direction for too long. Once the device is detected within a few feet of the vehicle (a distance that may be user configurable), the alert process can be terminated.

Figure 4:
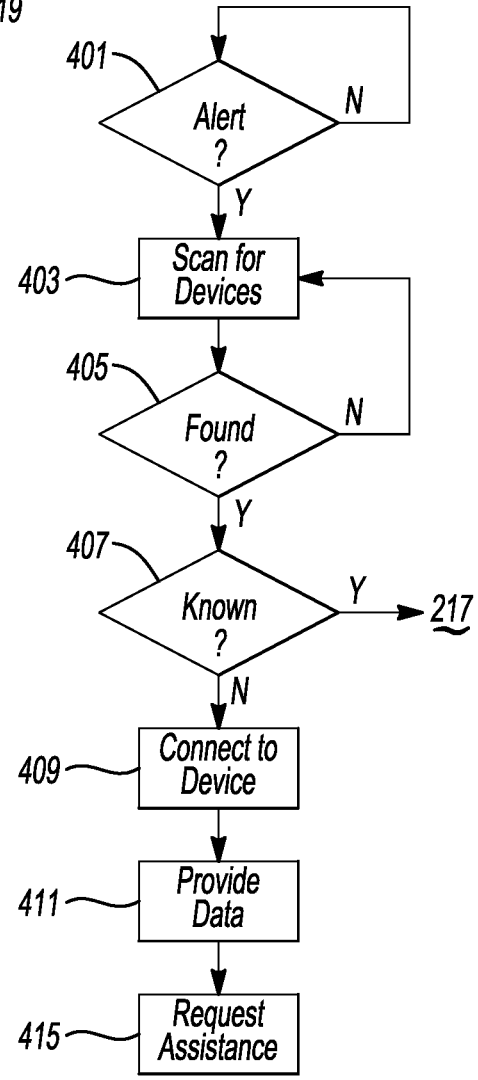
FIG. 4 shows an illustrative example of an assistance obtainment process.

FIG. 4 shows an illustrative example of an assistance obtainment process. In this example, the vehicle 100 may have reached a stage of alert where some form of assistance is desired. In addition to contacting emergency services, the vehicle 100 may be able to attempt to obtain localized assistance. Even if the vehicle sounds and lights attract other hikers or campers, they may not know what to do to assist a missing hiker. This is an example of a process where the vehicle 100 can provide some guidance.

In this example, the process determines if a suitable alert stage is met at 401. Until a threshold alert is met, the process may not attempt to contact local assistance, as this could result in false positive alerts and searches for hikers that were not actually missing. If the alert stage is suitable, such as a level two or three alert, where there is a reasonable likelihood that the person did not intentionally fail to return to the vehicle 100, the process can scan for nearby devices 403.

As previously noted, flashing lights and sounds may have attracted bystanders. This can include an escalation in sound, for example, or lighting, to a sound or light designed to attract bystanders. For example, vehicle LEDs could be changed to mirror emergency lights (by changes in color and frequency of flashing) and/or vehicle sounds could change from a horn to a siren or an actual message output through vehicle speakers, such as "person in need of assistance, please help." Even if the vehicle 100 lacks external speakers, it could lower windows and increase volumes of an internal sound system, rendering it hearable from significant distances.

Scanning for devices at 403 may produce one or more mobile device signatures at 405, indicative of either a user device or a unknown device at 407. If the device is the user device 131, the process may branch to forms of assistance intended to aid the user directly, as discussed prior. At the same time, or alternatively, the process may connect to a found-device using emergency credentials permitting direct connection under certain circumstances at 409.

The vehicle 100 can then provide data at 411, including user images, planned returns, images of where the user intended to hike, headings to a last known location, coordinates of a last known location, etc., to the local mobile device, which a passerby can use to assist the user if desired. The vehicle 100 may also provide a request for assistance at 415, which can include requests to help find the user, requests to travel to a cellular connection to contact emergency services (e.g., if the vehicle lacks a present cell connection, the user can get in their own vehicle and go call emergency services).

Figure 5:
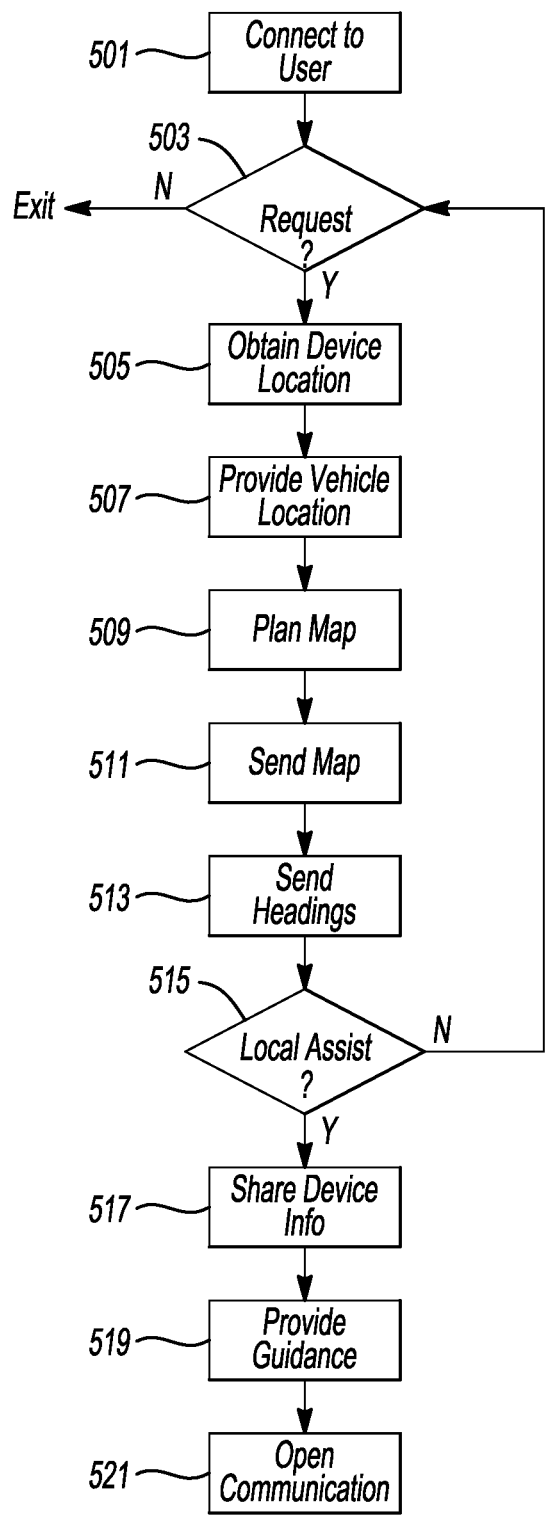
FIG. 5 shows an illustrative example of a guidance assistance process.

FIG. 5 shows an illustrative example of a guidance assistance process. In this example, the vehicle 100 connects to a user device 501 detected in a scan or with which the vehicle 100 has been maintaining consistent or periodic communication. If the user does not need assistance, either by directly indicating no assistance or not responding, when non-responsiveness does not indicate need, the process can exit. If the user asks for guidance or assistance, however, the process can request a device location from the mobile device at 505.

The vehicle can also provide the vehicle location to the mobile device at 507, so that both devices (phone and vehicle) can attempt to create guidance for the user, in case communication is lost. For example, a user may have hiked to a hilltop to obtain a cellular signal, allowing for such communication, but will lose the signal on the journey home. Providing a fixed vehicle location can assist the user in finding the vehicle 100, although the device also could have recorded this location prior to the journey's inception.

The vehicle 100 can use an onboard or remote map database, such as a topographical map, to plan a path back to the vehicle at 509. This may be different from a conventional mapping process, since there may not be roads and marked paths, but the vehicle can use basic algorithms to mark areas whose topography appears unpassable by a human on foot. The vehicle 100 can send both the map/plan and heading information to the mobile device, which can indicate a general direction of both the vehicle and a next journey-point. That is, the mobile device can display both a general direction of the vehicle 100 as well as an arrow to a next point in a planned path. Based on live observation, the user could determine which route was more preferable, such as a fallen tree providing passage over a ravine that the planned route marked because the vehicle 100 did not know about the tree.

The user can also expressly request local assistance or emergency assistance at 515. This can cause engagement of a process such as that shown in FIG. 4, where the vehicle attempts to attract attention and communicate with local devices. This process can also provide general directions to the user for use by the local device (e.g., the reverse of the path sent to the user) at 519 and share user device information at 517, such as a cellular number for contacting the user device when possible and/or communication credentials allowing for device to device communication when the devices are proximate.

When possible, the vehicle 100 may also open a direct communication channel between the local and user device 131, allowing for the nearby assistor to communicate directly with the remote and missing user.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle comprising:
one or more processors configured to:
determine that a trigger state designated for user assistance for a user traveling away from a vehicle has occurred;
determine that a user has not returned to the vehicle based on a failure to detect a designated user device;
determine an alert action to be taken, defined in conjunction with the trigger state; and
automatically execute the alert action responsive to the trigger state occurrence and the failure to detect the user device.

2. The vehicle of claim 1, wherein the trigger state includes a time having lapsed for a user to return and a user device not detected by a signal search for the device.

3. The vehicle of claim 1, wherein the trigger state includes a user being beyond a predefined distance from the vehicle based on mobile device coordinates communicated to the vehicle.

4. The vehicle of claim 1, wherein the trigger state includes a determination that at least one type of predefined weather has occurred or will occur above a threshold based on at least one of sensor observation or forecast data obtained by the vehicle.

5. The vehicle of claim 1, wherein the alert action includes at least one of sounding vehicle exterior audible systems or flashing vehicle lights.

6. The vehicle of claim 1, wherein the alert action includes lowering vehicle windows and playing an audible alert through an interior vehicle sound system at a predefined volume.

7. The vehicle of claim 1, wherein the alert action includes contacting emergency services.

8. The vehicle of claim 1, wherein the alert action includes attempting to discover one or more mobile devices proximate to the vehicle and communicating with the one or more mobile devices to provide location data related to the user based on planned travel data indicated by the user prior to the user traveling away from the vehicle.

9. The vehicle of claim 1, wherein the alert action includes attempting to discover one or more mobile devices proximate to the vehicle and communicating with the one or more mobile devices to provide location data related to the user based on last communication between the vehicle and the user indicating a last known user position.

10. A method comprising:
determining that a trigger state designated for user assistance for a user traveling away from a vehicle has occurred;
determining an alert action to be taken, defined in conjunction with the trigger state; and
determining that a user has not returned to the vehicle based on a failure to detect a designated user device;
automatically executing the alert action responsive to the trigger state occurrence and the failure to detect the user device.

11. The method of claim 10, wherein the trigger state includes a time having lapsed for a user to return and a user device not detected by a signal search for the device.

12. The method of claim 10, wherein the trigger state includes a user being beyond a predefined distance from the vehicle based on mobile device coordinates communicated to the vehicle.

13. The method of claim 10, wherein the trigger state includes a determination that at least one type of predefined weather has occurred or will occur above a threshold based on at least one of sensor observation or forecast data obtained by the vehicle.

14. The method of claim 10, wherein the alert action includes at least one of sounding vehicle exterior audible systems or flashing vehicle lights.

15. The method of claim 10, wherein the alert action includes lowering vehicle windows and playing an audible alert through an interior vehicle sound system at a predefined volume.

16. The method of claim 10, wherein the alert action includes contacting emergency services.

17. The method of claim 10, wherein the alert action includes attempting to discover one or more mobile devices proximate to the vehicle and communicating with the one or more mobile devices to provide location data related to the user based on planned travel data indicated by the user prior to the user traveling away from the vehicle.

18. The method of claim 10, wherein the alert action includes attempting to discover one or more mobile devices proximate to the vehicle and communicating with the one or more mobile devices to provide location data related to the user based on last communication between the vehicle and the user indicating a last known user position.

19. A vehicle comprising:

one or more processors configured to:

determine that a time threshold, designated by a user in advance of a journey away from a vehicle, has lapsed;

responsive to the lapsed threshold, scanning for wireless signals associated with a device correlated to the user; and responsive to a failure to detect the device, engage in at least one predefined alert action.

20. The vehicle of claim 19, wherein the alert action includes at least one of sounding vehicle audible alerts and flashing vehicle lights or sending communication to emergency services.

\* \* \* \* \*